United States Patent
Phely (10) Patent No.: US 10,440,873 B2
(45) Date of Patent: Oct. 15, 2019

(54) TIRE FOR AGRICULTURAL ROLLER AND AGRICULTURAL ROLLER EQUIPPED WITH SUCH TIRES

(71) Applicant: Otico, Chalmaison (FR)

(72) Inventor: Olivier Phely, Thenisy (FR)

(73) Assignee: OTICO, Chalmaison (FR)

( * ) Notice: Subject to any disclaimer, the term of this patent is extended or adjusted under 35 U.S.C. 154(b) by 291 days.

(21) Appl. No.: 15/076,766

(22) Filed: Mar. 22, 2016

(65) Prior Publication Data

US 2016/0286712 A1  Oct. 6, 2016

(30) Foreign Application Priority Data

Mar. 30, 2015 (FR) ..................... 15 52687

(51) Int. Cl.
| | |
|---|---|
| *A01B 29/04* | (2006.01) |
| *A01B 29/02* | (2006.01) |
| *B60C 11/00* | (2006.01) |
| *B60C 13/00* | (2006.01) |
| *B60C 15/02* | (2006.01) |
| *B60C 3/02* | (2006.01) |
| *B60C 3/04* | (2006.01) |

(Continued)

(52) U.S. Cl.
CPC ............ *A01B 29/02* (2013.01); *A01B 29/043* (2013.01); *B60C 3/02* (2013.01); *B60C 3/04* (2013.01); *B60C 5/008* (2013.01); *B60C 5/01* (2013.01); *B60C 11/0083* (2013.01); *B60C 13/003* (2013.01); *B60C 15/0233* (2013.01); *B60C 2011/0313* (2013.01); *B60C 2200/08* (2013.01)

(58) Field of Classification Search
CPC ........... A01B 29/043; B60C 3/02; B60C 3/04; B60C 2200/08

USPC ........................................................ 172/519
See application file for complete search history.

(56) References Cited

U.S. PATENT DOCUMENTS

| | | | | |
|---|---|---|---|---|
| 1,397,795 A | * | 11/1921 | Clifford-Earp | ........... B60C 7/12 152/327 |
| 2,713,373 A | * | 7/1955 | Daugherty | ............... B60C 7/12 152/158 |

(Continued)

FOREIGN PATENT DOCUMENTS

| | | |
|---|---|---|
| EP | 2 436 249 A2 | 4/2012 |
| EP | 2 556 734 A1 | 2/2013 |

(Continued)

OTHER PUBLICATIONS

French Preliminary Search Report dated Jan. 18, 2016 in French Application 15 52687, filed Mar. 30, 2015 (with English Translation of Categories of Cited Documents).

*Primary Examiner* — Gary S Hartmann
(74) *Attorney, Agent, or Firm* — Oblon, McClelland, Maier & Neustadt, L.L.P.

(57) ABSTRACT

An agricultural tool used to form furrows includes a generally cylindrical support and a plurality of tires. Each tire includes a sole by way of which the tire is mounted on the support, a tread opposite the sole (3) and two sidewalls that connect the tread to the sole. The sole, the tread (5) and the sidewalls jointly form a deformable casing. The tread of at least one of the plurality of tires has a generally domed shape. The sidewalls of this tire are generally inclined radially. The domed shape of the tread and the inclination of the sidewalls are such that the deformation of the casing urges the sole axially outward.

9 Claims, 9 Drawing Sheets

(51) Int. Cl.
*B60C 5/01* (2006.01)
*B60C 5/00* (2006.01)
B60C 11/03 (2006.01)

(56) References Cited

U.S. PATENT DOCUMENTS

| | | | | |
|---|---|---|---|---|
| 3,181,622 A * | 5/1965 | Adams | ................... | A01C 5/068 |
| | | | | 172/519 |
| 5,564,790 A * | 10/1996 | Lekavich | ................ | A63C 17/24 |
| | | | | 152/382 |
| 5,922,151 A * | 7/1999 | Piper | .................... | A63C 17/223 |
| | | | | 152/310 |
| 7,124,835 B2 * | 10/2006 | Piou | .................... | A01B 29/043 |
| | | | | 172/539 |
| 8,491,451 B2 * | 7/2013 | Phely | ................... | A01B 29/043 |
| | | | | 172/537 |
| 8,695,721 B2 * | 4/2014 | Phely | ................... | A01B 29/043 |
| | | | | 152/209.12 |
| 8,720,597 B2 * | 5/2014 | Piou | .................... | A01B 29/043 |
| | | | | 172/572 |
| 9,867,327 B2 * | 1/2018 | Phely | ....................... | B60C 7/12 |
| 2008/0230162 A1 * | 9/2008 | Piou | ................... | B60C 11/0311 |
| | | | | 152/209.12 |
| 2008/0318747 A1 | 12/2008 | Phely | | |
| 2013/0037284 A1 | 2/2013 | Phely et al. | | |
| 2014/0124112 A1 * | 5/2014 | Phely | ................... | B60C 17/009 |
| | | | | 152/450 |

FOREIGN PATENT DOCUMENTS

FR         2 763 279 A1    11/1998
FR         2 841 733 A1    1/2004
FR         2 917 569 A1    12/2008

* cited by examiner

TIRE FOR AGRICULTURAL ROLLER AND AGRICULTURAL ROLLER EQUIPPED WITH SUCH TIRES

BACKGROUND OF THE INVENTION

Field of the Invention

The invention relates to an agricultural tool used to work fields and form furrows therein.

Description of the Related Art

In order to form furrows in fields of earth, use is generally made of an elongate roller which is moved across the field. Such a tool is sometimes denoted "furrow roller" in the art. The roller comprises an elongate cylindrical support and a plurality of tires mounted alongside one another on the support, each tire working in a respective furrow.

Each tire conventionally comprises a part that forms a sole, by way of which the tire is mounted on the cylindrical support, a part that forms a tread, by way of which the tire is in contact with the bottom of the furrow, and two parts that forms sidewalls that each connect the tread to the sole.

The tires are sufficiently rigid to press the ground, notably at the bottom of the furrows. The tires become clogged in operation: earth, notably, regularly sticks to the tires. In order to reduce the clogging of the tires and, if need be, make it easier to clean them, it has become common practice to use tires that are shaped such that they deform sufficiently while rolling. The sole, the tread and the sidewalls jointly form a hollow casing for the tire, and the inside of this casing is fluidically connected to the outside of the tire. When the tire is rolling, its casing deforms.

In FR 2 997 653, for example, the Applicant has proposed a furrow roller that comprises tires with controlled deformation. The sidewalls of these tires have areas of weakness or inflection which cause the tire to sag while rolling: the sidewalls move aside toward the inside of the tire while the tread moves toward the sole. These rollers are generally satisfactory. They make it possible to work effectively in the furrows while having greatly improved cleaning capabilities, to the extent that it is possible, under most use conditions, to dispense with specific cleaning tools, such as scrapers or mud scrapers.

SUMMARY OF THE INVENTION

The Applicant has found that the majority of current furrow rollers, which comprise tires with a deformable casing, can, at least under quite particular working conditions, deteriorate prematurely. The arrangement of the tires on the support is sometimes modified, in particular as a result of a turn or a high speed. The rollers lose their effectiveness, in particular since the cleaning tools, configured to act between the tires, can no longer act. It is also possible for the tires themselves to become worn prematurely.

The invention aims to improve the situation.

To this end, the Applicant proposes an agricultural tool used to form furrows, comprising a generally cylindrical support and a plurality of tires. Each tire comprises a sole by way of which the tire is mounted on the support, a tread opposite the sole and two sidewalls that connect the tread to the sole. The sole, the tread and the sidewalls jointly form a deformable casing. The tread of at least one of the plurality of tires has a generally domed shape. The sidewalls of this tire are generally inclined radially. The domed shape of the tread and the inclination of the sidewalls are such that the deformation of the casing urges the sole axially outward.

The tool proposed maintains its effectiveness for longer than conventional tools. In particular, it is less subject to the offsetting of the tires on the support. The casing of the tire deforms in a way which allows it to be cleaned automatically. This casing deforms in such a way that it helps to press this tire against the adjacent tires. This considerably reduces the risk of the tires moving on the support, and prevents the occurrence of phenomena which damage and clog the tires.

The tool can have the following optional features, alone or in combination with one another:

At least one of the sidewalls furthermore has a generally concave and parabolic shape. In other words, in profile view, the inclination of a tangent to the sidewall increases regularly, with respect to the radial direction, from the tread to the sole. Such a sidewall working in compression in its main direction thus tends to exhibit limited bending oriented toward the inside of the tire. The risk of the sidewall folding or moving aside in operation is reduced. The axial component of the urging of the sole outward that is generated by the deformation of the casing is thus greater.

The tire furthermore comprises at least one reinforcement housed in the sole, close to a junction with one sidewall. The axial end of the tire is thus stiffened. The risk of accidental moving apart or loss of pressing together between the tire and a bearing face in operation is reduced.

The tire has a working height greater than 28% of the width of the tire. Such a working height makes it possible, depending on the desired inter-row distance, to work in furrows at a great depth without damaging the contours of the furrows.

At least one of the sidewalls is connected to the sole by way of a shoulder. The shoulder forms an area of contact with the ground in operation while having little deformation, thereby improving the integrity of the tire about the support and the good indexing thereof in the axial direction with respect to the other tires. Furthermore, in the fitted state of two adjacent tires, the treads of each of the adjacent tires are connected together in a substantially continuous manner. A substantially continuous connection zone is less subject to the accumulation of debris. The risk of debris passing between two tires and of deterioration is reduced.

A straight line passing through a crown of the tread and through a point where a sidewall joins the sole crosses a lateral surface of the sole. Such a straight line has an inclination which corresponds substantially to the inclination of the sidewalls. It represents substantially the transmission of the forces from the domed shape of the tread to the sole. By checking that the lateral surface of the sole is substantially aligned with the sidewalls, it is possible to limit the effects of shear which could otherwise appear and at least partially counteract the urging of the sole axially outward that is generated by the deformation of the casing.

The straight line crosses the lateral surface of the sole in a portion of the sole that corresponds to a radially outer half thickness of the sole. Thus, at least the radially outer part of the sole is urged axially outward under the effect of the deformation of the casing. In operation, this part which comes into contact with the ground and is thus more subject to impacts and debris is then particularly urged laterally outward, thereby improving the pressure against the corresponding bearing face.

The domed shape of the tread and the inclination of the sidewalls are such that the portion of the straight line that extends between the crown of the tread and the junction point between a sidewall and the sole remains within the thickness of said sidewall.

Each of the sidewalls has a curvature of constant sign from the tread to the sole. Thus, the curvature, if it exists, remains positive or remains negative along the entire sidewall. In other words, the sidewall either has a flat profile, or is only concave or only convex. It cannot have a concave part and a convex part. The sidewall thus does not have an inflection point, which would hamper the transmission of forces from the domed shape to the sole and would, on the contrary, encourage deformation of the casing in which the sidewalls tend to move aside or to bend on themselves.

According to another aspect of the invention, the Applicant proposes a tire comprising a sole by way of which the tire is mounted on a support, a tread opposite the sole and two sidewalls that connect the tread to the sole. The sole, the tread and the sidewalls jointly form a deformable casing. The tread has a generally domed shape. The sidewalls are generally inclined radially. The domed shape of the tread and the inclination of the sidewalls are such that the deformation of the casing urges the sole axially outward.

The Applicant also proposes a kit comprising a generally cylindrical support and at least one tire comprising a sole by way of which the tire is mounted on the support, a tread opposite the sole and two sidewalls that connect the tread to the sole. The sole, the tread and the sidewalls jointly form a deformable casing. The tread has a generally domed shape. The sidewalls are generally inclined radially. The domed shape of the tread and the inclination of the sidewalls are such that the deformation of the casing urges the sole axially outward.

BRIEF DESCRIPTION OF THE DRAWINGS

The present invention will be understood better from reading the detailed description of several embodiments that are given by way of nonlimiting examples and are illustrated in the appended drawings, in which.

DETAILED DESCRIPTION OF THE PREFERRED EMBODIMENT

The drawings and the description below essentially contain elements of a certain nature. They can therefore be used not only to make the present invention easier to understand but also to contribute towards defining it, if need be. It should be noted that elements such as the profile geometry of tires are difficult to define in full, other than by drawing them.

Figure 1:
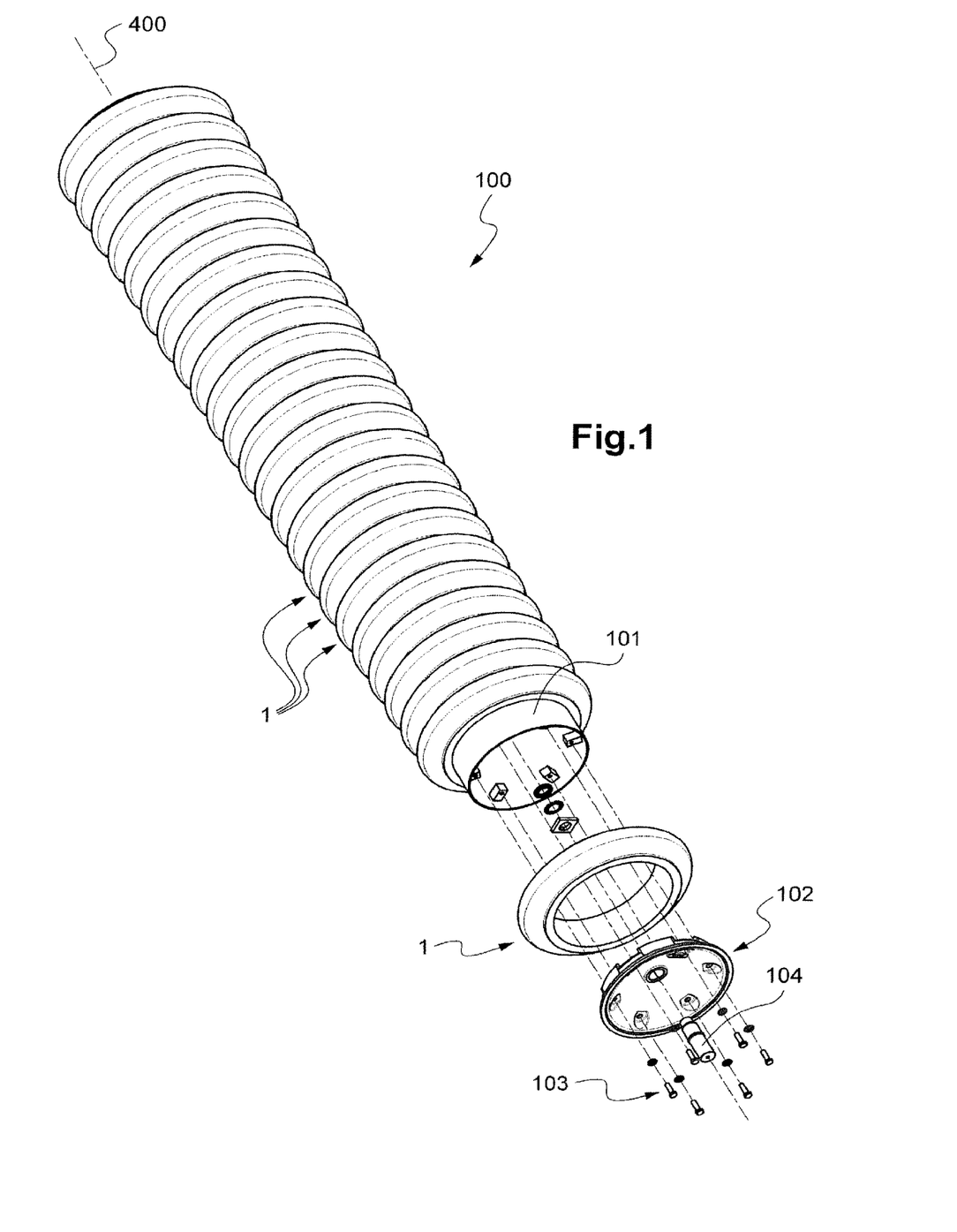
FIG. 1 shows a partially exploded and perspective view of a tool according to the invention.
Figure 2:
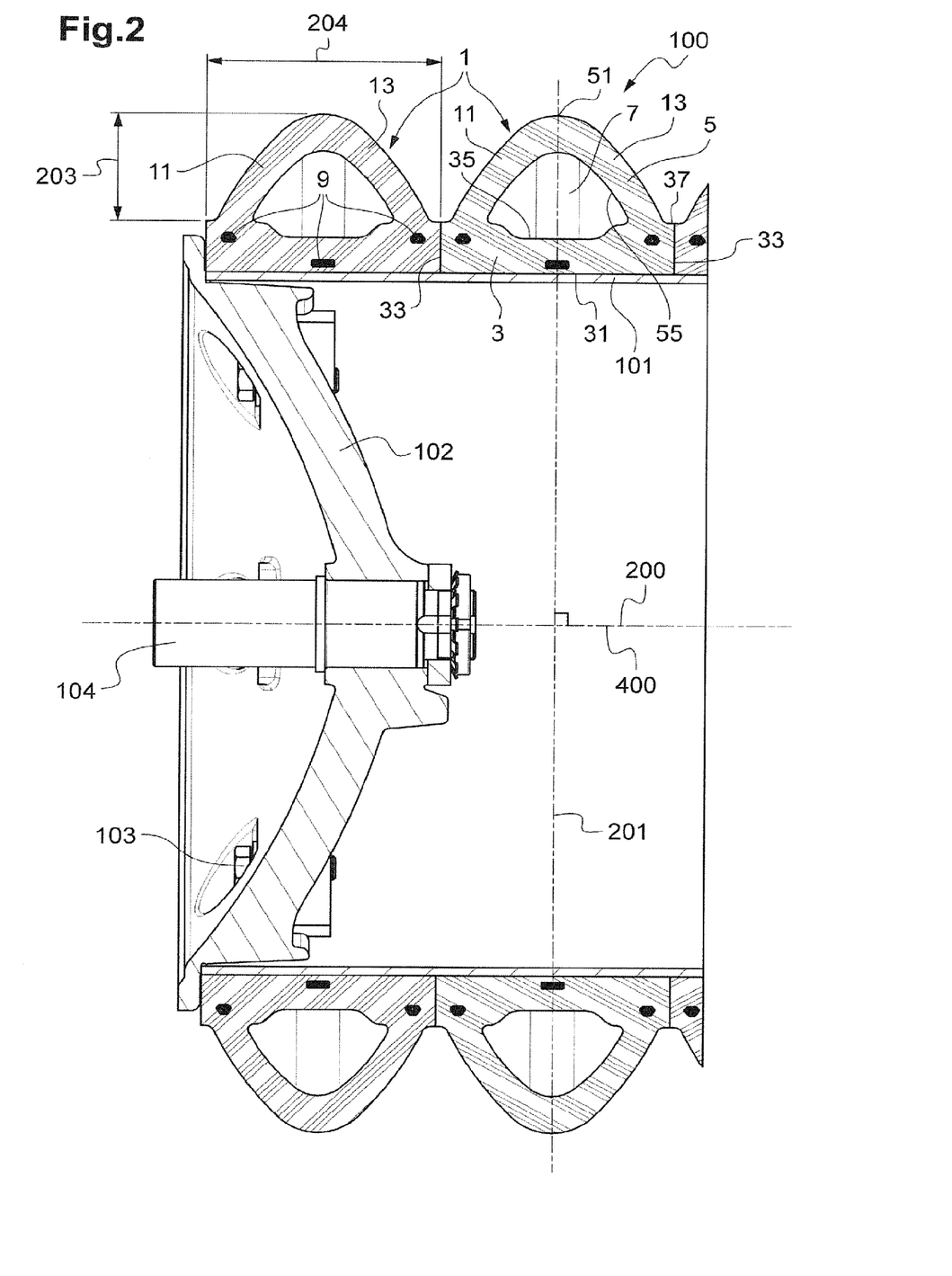
FIG. 2 shows a partial and sectional view of the tool in FIG. 1.

Reference is made to FIGS. 1 and 2.

They show an agricultural roller 100 for forming furrows. The roller 100 corresponds to what is known as a furrow roller in the art. The roller has the general appearance of an elongate cylinder. The roller 100 comprises a generally cylindrical elongate support 101 having a longitudinal axis 400 and a plurality of tires 1 mounted around the support 101. The tires 1 are disposed alongside one another in the longitudinal direction of the support 101. The tires 1 are distributed longitudinally in a manner corresponding to what is referred to as the inter-row distance in the art, that is to say the spacing between two adjacent furrows. In this case, the tires are in contact with one another.

The tires 1 are pressed together axially, in the longitudinal direction of the roller 100. In this case, the roller 100 furthermore comprises two flanges 102 that are each fixed to one longitudinal end of the support 101, in this case by means of screws 103. The axial pressing together of the tires 1 is maintained by the flanges 102. The flanges 102 can be considered to be end plates of the support 101.

The roller 100 is intended to be mounted so as to rotate about the longitudinal axis 400, for example on the chassis of an agricultural machine. Each flange 102 in this case supports an axle pin 104 intended to be received in a bearing. The axle pin 104 can be considered to be a stub axle.

Each tire 1 has a generally annular shape with a central axis 200. Each tire 1 has a median plane 201 perpendicular to the central axis 200. In the mounted state, the central axis 200 of each tire 1 is substantially coincident with the longitudinal axis 400 of the support 101.

In this case, for each tire 1, the median plane 201 corresponds to a plane of symmetry.

The tires 1 are constrained in the longitudinal direction of the support 101. In the mounted state, the width of a tire 1 is less than the width of the tire 1 in the free state, for example by around 5%. In the example described here, the width 204 in the installed state of the tire 1 is around 125 millimeters, while the width of this tire 1 at rest is around 131 millimeters. The flanges 102 maintain this constrained state at the end of mounting and in operation. The constrained state of the tires 1 is substantially homogeneous across the width of the roller 100.

In this case, the tires 1 are in contact with one another. The tires 1 are mounted contiguously. Alternatively, one or more spacers could be interposed between adjacent tires. This makes it possible to modify the mutual spacing of the tires in correspondence with an inter-row distance. In this case, these tires are pressed together by way of the spacers. Such spacers can be mounted freely about the support 101 to make mounting easier.

At least some of the spacers can be secured to the support 101. The spacers then act as stops between tires.

Figure 3:
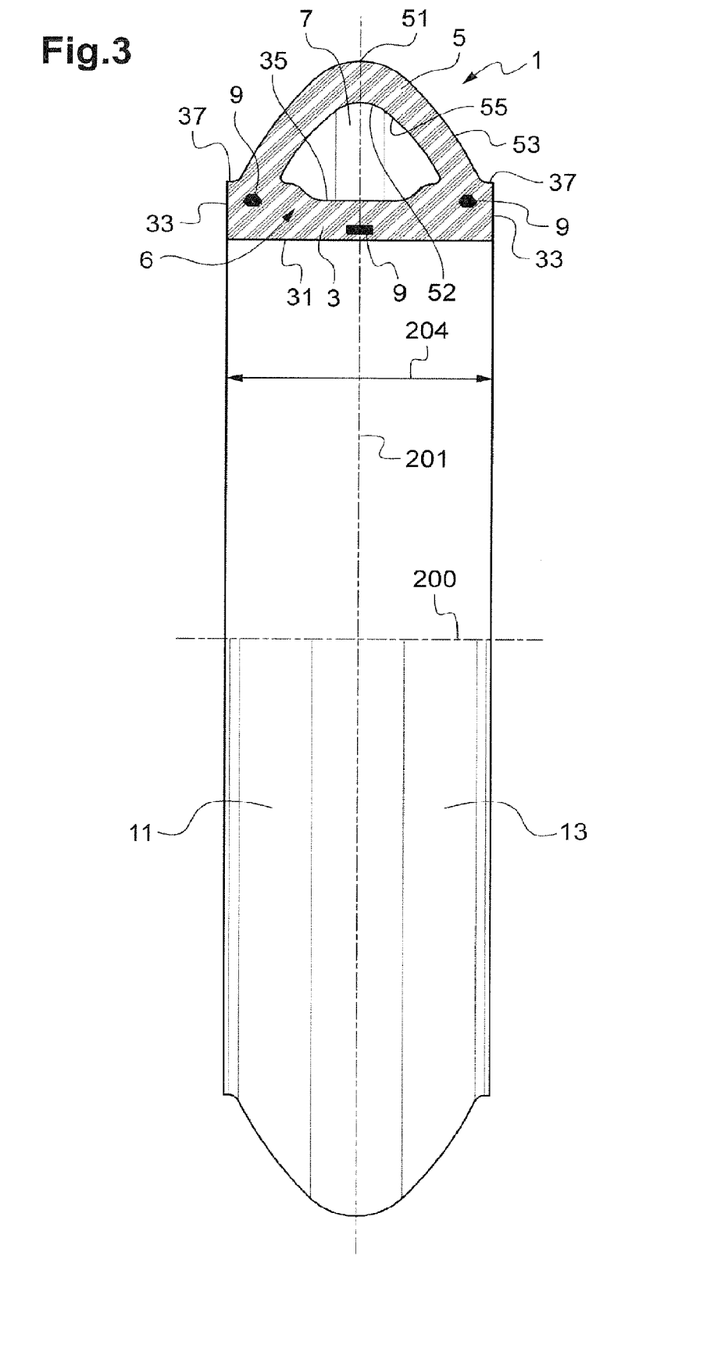
FIG. 3 shows a partially sectional view of a tire with which the tool in FIG. 1 is equipped.
Figure 4:
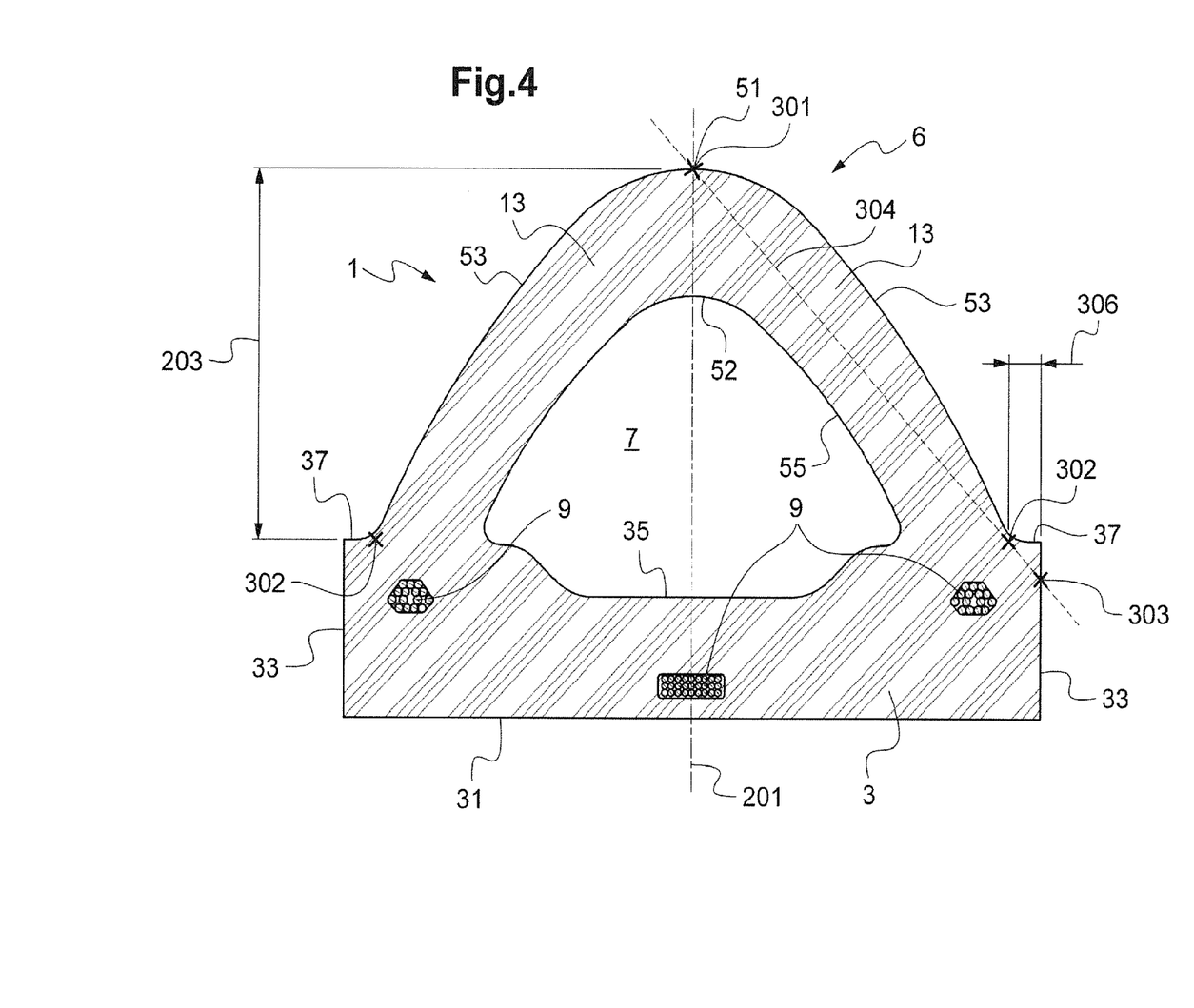
FIG. 4 shows the sectional profile of the tire in FIG. 3.
Figure 5:
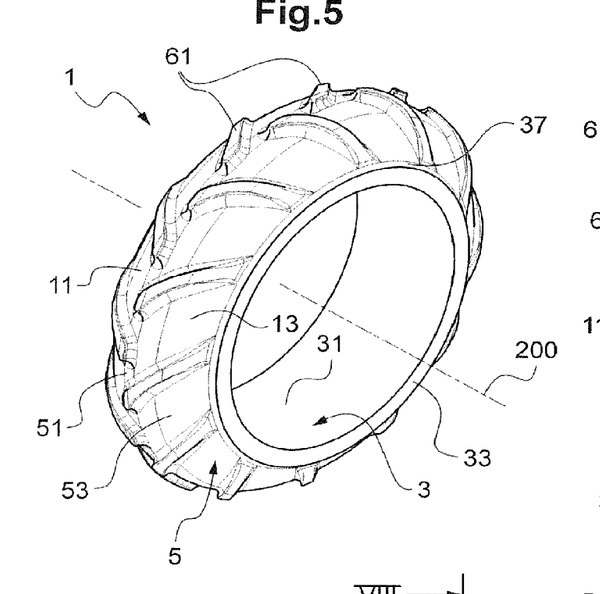
FIG. 5 shows a perspective view of a tool according to the invention.
Figure 6:
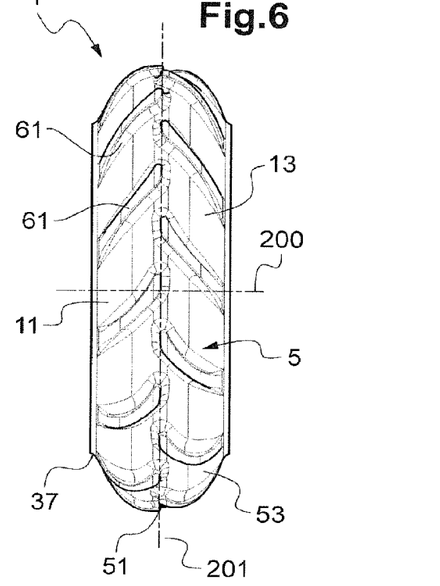
FIG. 6 shows a front view of the tool in FIG. 5.
Figure 7:
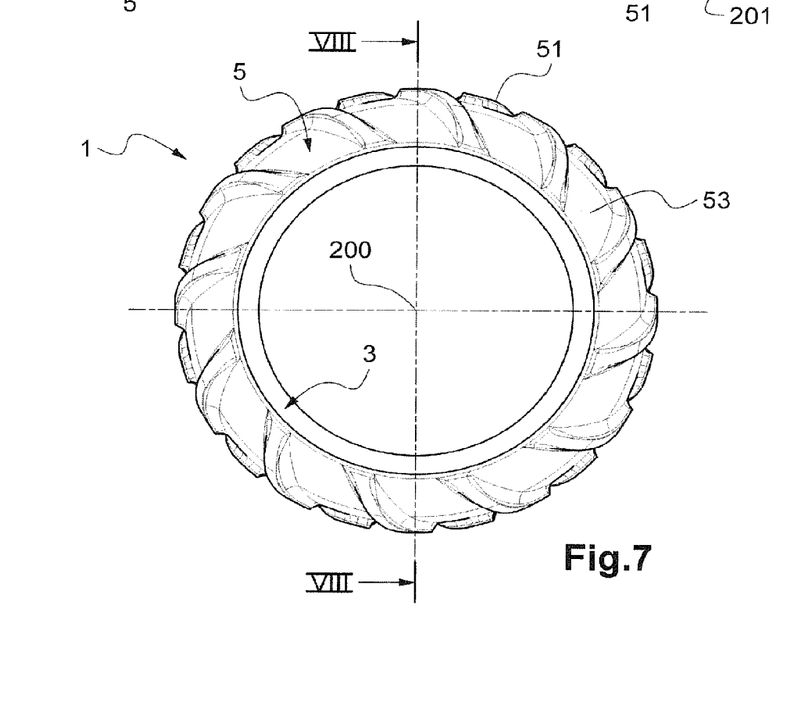
FIG. 7 shows a side view of the tool in FIG. 5.
Figure 8:
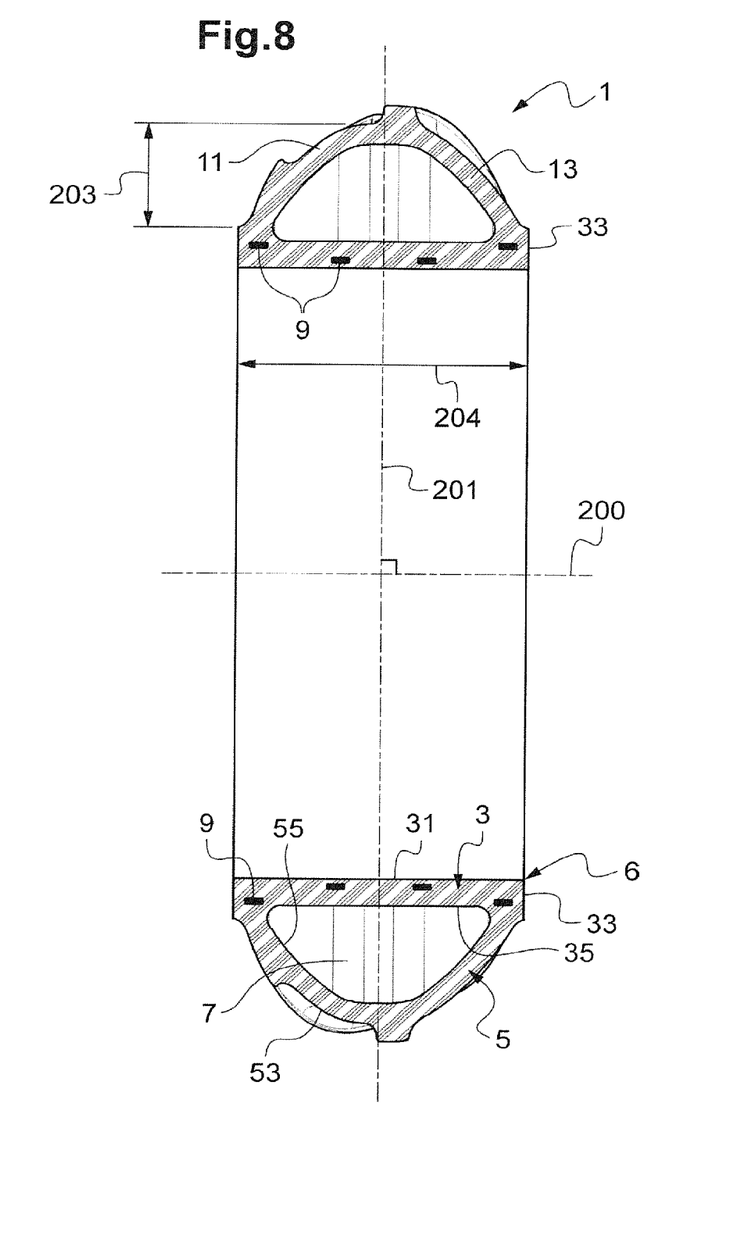
FIG. 8 shows a cross-sectional view along the straight line VIII-VIII in FIG. 7.
Figure 9:
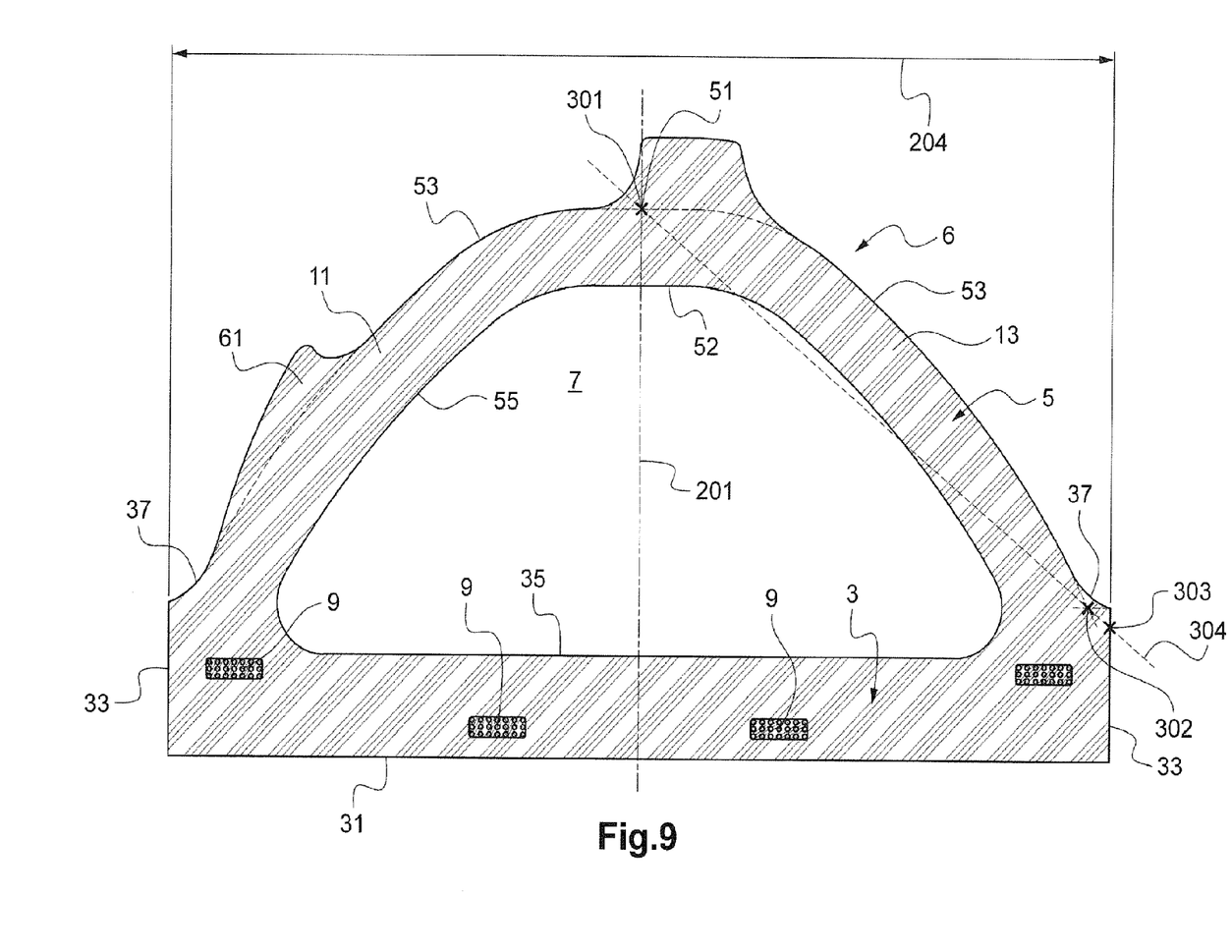
FIG. 9 shows the cross-sectional profile of the tool in FIG. 8.

Reference is made to FIGS. 3 and 4. FIG. 4 shows a profile of the tire 1 corresponding to a section in a radial plane.

The tire 1 comprises a part that forms a sole 3, a part that forms a tread 5 and two parts that form sidewalls 11 and 13 that each connect the tread 5 to the sole 3. The sole 3 and the tread 5 each have a generally annular shape. When the tool is working, the tread 5 rolls on the bottom of a furrow.

The sole 3, the tread 5 and the sidewalls 11, 13 jointly form a casing 6 of the tire 1 about a chamber 7. The casing 6 is uniform around the circumference of the tire 1.

The tire 1 is of the semi-hollow type. The chamber 7 is fluidically connected to the outside of the tire 1. The casing 6 is free to deform when the tire 1 is rolling. This deformation causes the unsticking of earth which tends to stick to the tire 1.

The tire 1 is mounted on a generally cylindrical support by the sole 3, for example the support 101 described with respect to FIGS. 1 and 2.

The sole 3 has a seat surface 31 having a shape corresponding to an outer surface of the support and two lateral surfaces 33 that are each intended to come into contact with a bearing surface. This bearing surface can be:
- a lateral face of a tire 1 mounted adjacently on the support,
- a face of a spacer mounted adjacently on the support,
- a face of a flange, for example one of the flanges 102 described with respect to FIGS. 1 and 2.

In this case, the lateral surfaces 33 are substantially flat. The lateral surfaces 33 extend substantially parallel to the median plane 201. Alternatively, the lateral surfaces 33 can be frustoconical.

The sole 3 has an inner surface 35 away from the seat surface 31. The inner surface 35 extends substantially between the sidewalls 11, 13.

The tread 5 has an inner surface 52 directed toward the chamber 7 and an outer surface 51 away from the inner surface 52. The inner surface 52 of the tread 5 is located opposite the inner surface 35 of the sole 3. The outer surface 51 of the tread 5 is directed toward the outside of the tire 1.

The tread 5 is generally domed, for example in the form of a dome or ogive. The outer surface 51 of the tread 5 has a crest line which corresponds to a crown in the profile of this surface. The crest line is substantially contained in the median plane 201. This crest line forms the radial end of the tire 1. The domed shape of the tread 5 limits the deformation of the casing of the tire. It prevents the sagging of the tread 5.

In this case, the profile of the outer surface 51 has a single crown.

Each sidewall 11, 13 is connected to the sole 3 next to one or the other of the lateral surfaces 33. Each sidewall 11, 13 has an inner surface 55 directed toward the chamber 7 and an outer surface 53 away from the inner surface 55.

The sidewalls 11, 13 extend generally in a radially inclined manner. A distance that separates the sidewalls 11, 13 from one another increases from the tread 5 to the sole 3. In other words, the sidewalls 11 and 13 become closer together in the direction of the tread 5. In this case, each sidewall 11, 13 is inclined at an angle of between 4.5° and 60° with the radial direction, preferably between 25° and 35°.

The sidewalls 11, 13 form an acute angle with the sole 3.

In operation, the casing 6 deforms in such a way that the lateral surfaces 33 of the sole 3 are pushed toward the outside. The lateral surfaces 33 are urged toward their corresponding bearing surface, for example toward the lateral face of an adjacent tire 1 of the roller 100. This results in additional pressing, in operation, of each lateral surface 33 against an adjacent bearing face, thereby preventing the introduction of debris between the lateral surface 33 and the corresponding bearing face. The integrity of the furrow roller equipped with such a tire, for example the roller 100 described above, is improved thereby. The furrow roller wears down less quickly and thus has a longer service life.

The sidewalls 11, 13 transmit forces from the tread 5 to the sole 3. The particular configuration in which the tread 5 is domed and the sidewalls 11, 13 inclined generates forces in the sole 3 which have an axial component directed toward the outside of the tire 1.

The domed shape of the tread 5 contributes toward the transmission to the sidewalls 11 and 13 of forces to which this tread 5 is subjected. The inclined sidewalls 11 and 13 work at least partially in compression. In operation, they preserve the main direction that they had at rest. The domed configuration of the tread 5 and the inclined configuration of the sidewalls 11, 13 cooperate such that the deformation of the casing 6 comprises an axial expansion of the sole 3 that results from a radial displacement of the tread 5 toward the sole 3. The tread 5 deforms little. The sidewalls 11, 13 deform so as to make cleaning easier. The sole 3 tends to expand laterally outward. In the state blocked between two bearing faces, this tendency toward axial expansion results in better axial support against the bearing faces.

The casing 6 can be considered to have a section in the overall shape of an isosceles trapezoid in which the tread 5, which is domed toward the outside, corresponds to the short base.

The tread 5 and the sidewalls 11, 13 have thicknesses that are substantially identical to one another. As seen in radial section, the casing 6 has a substantially constant thickness and substantially regular surfaces from the connection between the first sidewall 11 and the sole 3 to the connection between the second sidewall 13 and the sole 3, passing via the tread 5. This limits the risks of the appearance of stress concentration regions and incipient bending regions.

Reference is made to that part of FIG. 4 that is located to the right of the median plane 201. The left-hand part can be deduced from the right-hand part by symmetry with respect to the median plane 201.

The outer surface 53 of the sidewall 13 is connected to the lateral surface 33 of the sole 3 by a surface in the form of a shoulder 37. The shoulder surface 37 corresponds to an outer surface of the sole 3.

Figure 11:
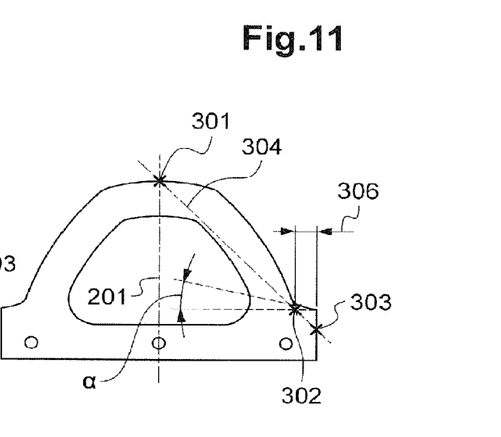
Figure 13:
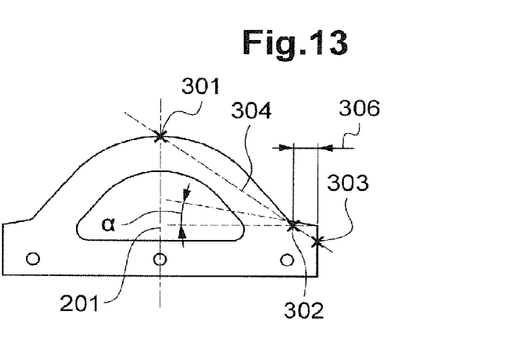
Figure 14:
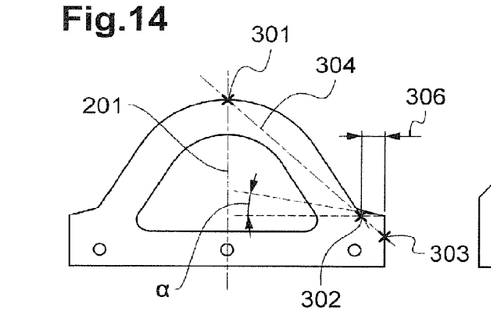

The shoulder surface 37 is cylindrical about the central axis 200. The shoulder surface 37 is substantially perpendicular to the lateral face 33. The shoulder surface 37 forms an obtuse angle with the outer surface 53 of the sidewall 13. Alternatively, the shoulder surface 37 can be frustoconical. The angle between the shoulder surface 37 and the lateral face 33 can be obtuse. The shoulder surface 37 then forms a half angle at the crown with the central axis 200, this angle being referenced a in FIGS. 11, 13 and 14.

The outer surface 53 of the sidewall 13 is connected to the shoulder surface 37 by a joining part 52. In this case, the joining part 52, of concave shape, forms a connecting fillet. This connecting fillet prevents stress concentration and prevents the sidewalls from bending in operation. The connecting fillet also makes it easier to evacuate earth and prevents the accumulation of debris.

In this case, the shoulder surface 37 and the lateral surface 33 are connected together by a sharp edge. This prevents an accumulation of debris between the lateral surface 33 and the corresponding bearing face, in particular the lateral surface of an adjacent tire. This configuration with a sharp edge is all the more effective the less the shoulder surface 37 is inclined, or even cylindrical, that is to say at an angle α close to 0°.

In this case, the width 306 of the shoulder surface 37, that is to say the extent thereof in the longitudinal direction, is less than half the radial dimension of the bearing surface 33. The radial dimension of the bearing surface 33 is, in this case, between 30 and 40 millimeters.

Figure 10:
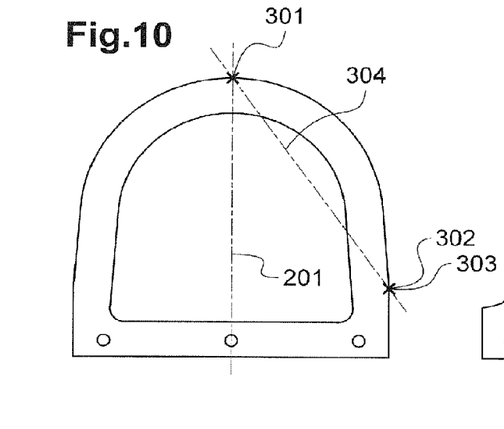
FIGS. 10 to 15 show cross-sectional views of profiles of embodiments of tools according to the invention.
Figure 12:
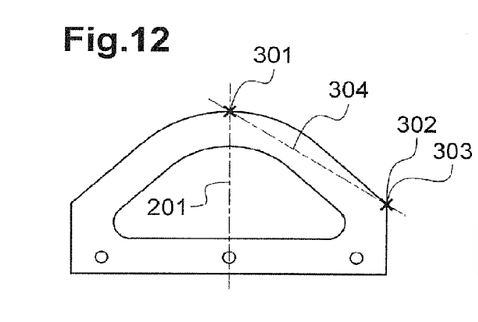
Figure 15:
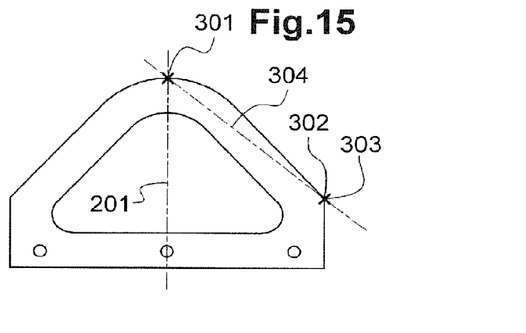

FIGS. 10, 12 and 15 show a tire 1 that does not have a shoulder surface 37. The outer surface 53 of the sidewall 13 and the lateral surface 33 of the sole 3 are in this case connected together by a sharp edge. This reduces the risk of the accumulation of debris.

In the examples described here, the casing 6 of the tire 1 is produced in one piece. The casing 6 is produced from elastomer, for example rubber or polyurethane. The sole 3, the tread 5 and the sidewalls 11, 13 are produced from a single elastomer. The elastomer has a Shore A hardness of between 43 and 75.

In the examples described here, the tire 1 furthermore comprises reinforcements 9, or reinforcing elements, of which there are three in this case. The reinforcements 9 are formed by metal rings embedded in the sole 3. The rings are obtained by gathering metal wires into bundles. The reinforcements 9 can be considered to be cords or annular bead wires which extend circumferentially in the sole 3. A central reinforcement 9, belonging to the median plane 201, is disposed in the radially inner half thickness of the sole 3, that is to say close to the seat surface 31. Two lateral reinforcements 9 are disposed in the radially outer half thickness of the sole 3, in the vicinity of each of the bearing surfaces 33. The lateral reinforcements 9 are symmetrical with respect to one another about the median plane 201. The central reinforcement 9 has a substantially rectangular section that is elongate in the axial direction. The lateral reinforcements 9 each have a substantially circular cross section. In this case, the reinforcements 9 are produced by recycling metal bead wires that are used in motor vehicle tires.

The lateral reinforcements 9 are disposed close to the lateral surface 33 and to the shoulder surface 37 or the outer surface 53 of the sidewall 11. This disposition of the reinforcements 9 further reduces the risks of debris being introduced close to the lateral surface 33 of the sole 3.

Reference is made to FIG. 4, which shows a profile of the tire 1.

A first point corresponds to the crown 301, that is to say to the radial end of the tread 5. The crown 301 corresponds to that point of the profile that is farthest away from the central axis 200. In the example described here, the crown 301 belongs to the median plane 201. The crown 301 also belongs to the outer surface 51.

A second point corresponds to a joining point 302 at which the sidewall 13 is joined to the sole 3. The joining point 302 is situated at a radial position corresponding to that of the radial end of the bearing surface 33. The position of the joining point 302 is independent of the presence or absence of a connecting fillet between the outer surface 53 of the sidewall 13 and the bearing surface 33 of the sole 3. In this case, the joining point 302 corresponds to the point at which the outer surface 53 of the sidewall 13 and the shoulder surface 37 of the sole 3 cross, away from the connecting fillet.

A straight line 304 passing through the crown 301 and the joining point 302 intersects the lateral surface 33 at a third point 303. The crossing point 303 is situated, in this case, in the radially outer half thickness of the sole 3.

The radial distance that separates a radial end of the tread 5 and the sole 3 corresponds to a working height 203 of the tire 1. The working height 203 corresponds to the distance, in the radial direction, which separates the crown 301 and the joining point 302. In other words, the working height 203 corresponds in this case to the overall height of the profile as shown in FIG. 4, from which the thickness of the sole 3 at its axial end is subtracted. The working height 203 is in this case greater than 28% of the width 204 of the tire 1, i.e. in this case greater than 35 millimeters. Specifically, it has been found that a tire 1 that complies with such a ratio between the working height 203 and the width 204 makes it possible to work the earth deeply. For example, a tool equipped with such tires can work the earth subsequently to a disk and/or teeth. In this case, the earth is first of all loosened by the disk and/or teeth, and then the tires fix the shape of the furrows and consolidate the walls and bottom thereof. Such a treatment makes it possible to trap moisture in the earth and prevent it from drying out too quickly under the effect of the wind. The deterioration of the furrows by erosion phenomena is also lessened. This also makes it possible to promote the rapid germination of weeds. Thus, by working the earth for a second time, for example with the same tools, several days later, for example two weeks later, the weeds are easily removed mechanically. The use of chemical means can be avoided, or at least reduced.

The reaction of the ground on the tire 1 is mainly perpendicular to the central axis 200. The reaction of the ground is exerted at the crown 301 of the profile.

This results in deformation of the casing 6 of the tire 1. This deformation makes it easier to unstick earth which tends to stick to the outer surfaces.

The reaction of the ground is at least partially transmitted to the sole 3 by the sidewalls 11, 13. The Applicant has found that, by producing a tire 1 that has a profile in which the straight line 304 crosses the bearing surface 33 (the crossing point 303) in the radially outer half thickness of the sole 3, the reaction of the ground applied to the crown 301 corresponds to a force at the lateral surface 33, at the crossing point 303, comprising an axial component directed toward the outside of the tire 1.

This configuration of the tire 1 thus makes it possible to generate a pressing force of the bearing surface 33 of the tire 1 against the corresponding bearing face of the tool 100, for example the homologous face of the adjacent tire, this pressing force resulting from the reaction of the ground.

Such a configuration distinguishes notably the tire 1 from known tires, in particular from those in which the profile comprises inflection points for favoring the deformation and moving aside of the sidewalls by bending on themselves.

In the case of a roller comprising contiguous tires, the force at the crossing point 303 improves the pressing together of two adjacent tires. This results in an additional stress compared with the stresses resulting from the axially pressed-together mounting of the tires around the support 101. The pressing together of the lateral faces of two adjacent tires is improved. The risk of debris being introduced between the lateral faces of two adjacent tires 1 is reduced. Tools, such as rollers 100, equipped with such tires 1 have an increased service life compared with known tools.

In the examples described thus far, the tire 1 has a profile that is substantially uniform around its circumference.

Reference is made to FIGS. 5 to 9. Elements similar to those in the embodiments described above have the same reference numerals.

FIGS. 5 to 9 show a tire 1 similar to the tire 1 in FIGS. 1 to 4, apart from the nonuniform profile around the circumference. The tire 1 comprises studs 61 that protrude from the outer surfaces 51 and 53 of the tread 5 and the sidewalls 11, 13. Impressions can be provided instead of at least some of the studs 61. The studs 61 and the impressions improve the grip of the tire 1.

The effects of the studs 61 or of tread patterns on the deformation of the casing 6 of the tire 1 are negligible. The description relating to the profile of the tire 1 in FIGS. 1 to 4 is transposable to the embodiment in FIGS. 5 to 9. The studs 61 and the impressions are not taken into consideration to determine the position of the crown 301, the joining point 302 and the crossing point 303 between the straight line 304 and the lateral surface 33. As is apparent from FIG. 9, for example, the crown 301 is located at the crown of the tread 5, that is to say the point on the profile that is farthest away from the central axis 200, the stud 61 being ignored.

FIGS. 10 to 15 each depict a tire 1 profile in which the crown 301, the joining point 302 and the crossing point 303 and also the straight line 304 are depicted. FIGS. 10, 12 and 15 depict tires 1 without a shoulder surface 37. When the shoulder surface 37 is absent, the joining point 302 and the crossing point 303 are coincident. In FIG. 10, the domed shape, as seen in section, of the tread 5 is substantially semicircular. The sidewalls 11, 13 are inclined with respect to a radial direction at a small angle, around 4.5° in this case.

Figure 16:
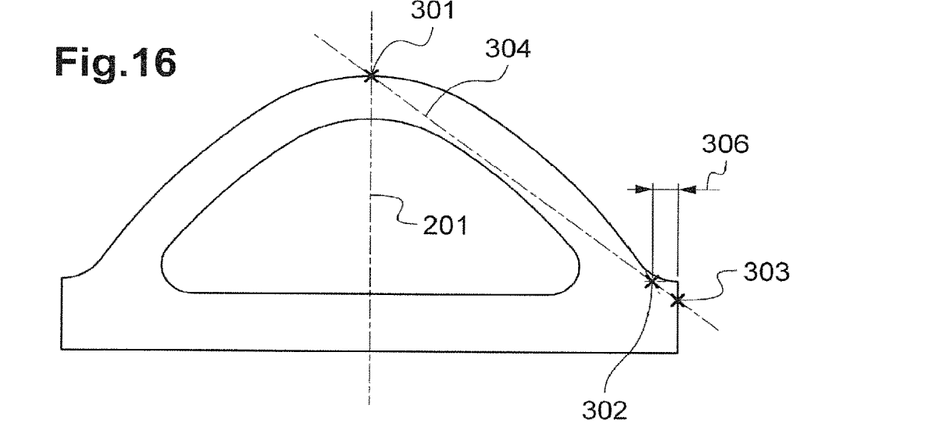
FIGS. 16 and 17 depict profiles having respectively convex and concave treads.

FIG. 16 depicts a profile in which the sidewalls 11, 13 comprise convex parts, in this case curved toward the outside. This facilitates deformation of the outer surface of the sidewall, thereby improving the unsticking of earth in operation. The convexity of the sidewalls 11, 13 is limited such that the deflection of the convex shape remains less than the half thickness of the sidewall. Buckling of the sidewalls 11, 13 and abrupt sagging of the profile are thereby avoided.

Figure 17:
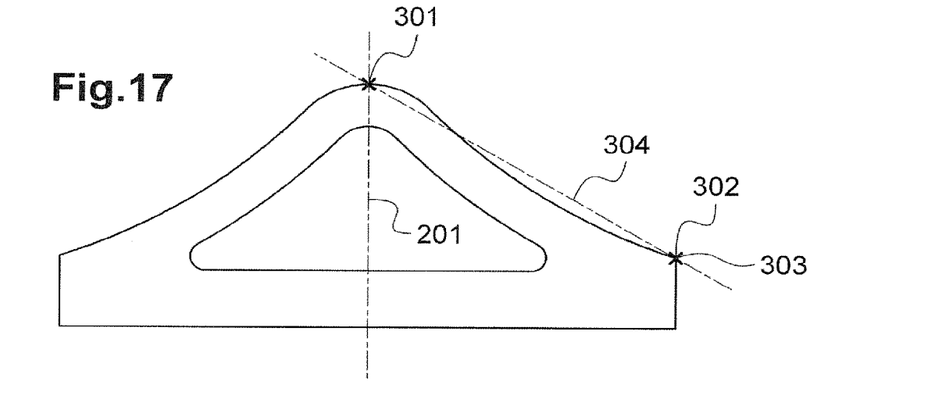

FIG. 17 depicts a tire 1 profile in which the sidewalls 11, 13 comprise concave parts, in this case curved toward the inside. This facilitates the unsticking of earth in operation. As seen in profile, the sidewalls 11, 13 have in this case the overall shape of a parabola. This parabolic shape of the sidewalls 11, 13 between the tread 5 and the sole 3 also allows deformation of the casing 6 in which the proportion of the axial component in the forces generated close to the lateral surface 33 is high.

Figure 18:
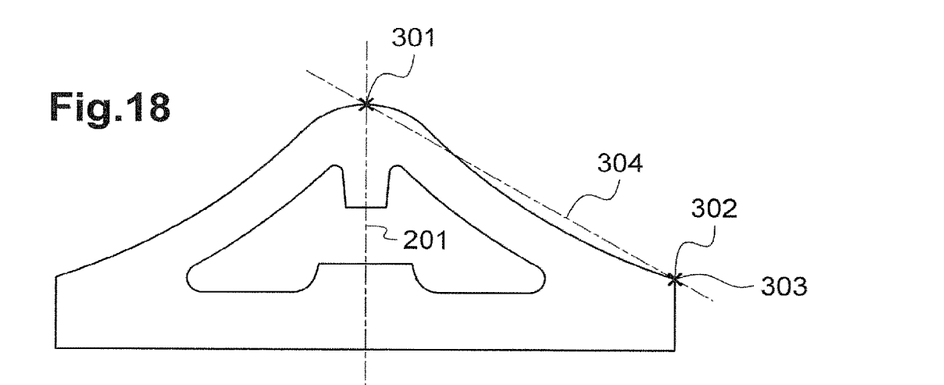
FIG. 18 depicts a variant of the profile in FIG. 17.

The buckling of the sidewall and the sagging of the tread can be limited by bringing the inner surface 55 into abutment for example against the inner surface 35 of the sole 3 or against stops that are provided to this end in the chamber 7. A variant of the profile in FIG. 17 that is provided with stops is depicted in FIG. 18.

The geometric definitions of the crown 301, the joining point 302, the crossing point 303 and the straight line 304 in the profile of the tire aim to define in a structural manner a configuration of the casing 6 that is capable of deforming in the manner indicated above. A person skilled in the art will understand that further, structural or functional, definitions could be considered to be equivalents for defining the configuration of the tire.

For example, a tool according to the invention can also be considered to be a tire 1 comprising a sole 3 by way of which the tire 1 is mounted on a support 101, a tread 5 opposite the sole 3 and two sidewalls 11, 13 that connect the tread 5 to the sole 3. The sole 3, the tread 5 and the sidewalls 11, 13 jointly form a deformable casing 6. The tread 5 has a generally domed shape. The sidewalls 11, 13 are generally inclined radially. The domed shape of the tread 5 and the inclination of the sidewalls 11, 13 are such that the deformation of the casing 6 urges the sole 3 axially and outward.

In the embodiment in FIG. 1, the tires 1 of the roller 100 are similar to one another. Alternatively, different tires can be mounted together and form a tool.

In the embodiments described above, the median plane 201 of each tire 1 also constitutes a plane of symmetry for the tire 1. Alternatively, at least some of the tires can be asymmetrical. For example, at least one of the tires that are disposed at the ends of the support 101 can partially have a specific shape, in particular which corresponds to a shape of the adjacent flange 102.

The invention is not limited to the examples of tools described above, only by way of example, but encompasses all the variants that can be envisaged by a person skilled in the art in the scope of the following claims.

The invention claimed is:

1. An agricultural tool used to form furrows, comprising: a generally cylindrical support and a plurality of tires, each tire comprising:
    a sole by way of which the tire is mounted on the support, the sole comprising, at opposing ends of the sole in an axial direction of the generally cylindrical support, radially extending lateral surfaces,
    a tread opposite the sole, and
    two sidewalls that connect the tread to the sole via respective junction points, each junction point being situated at a radial position corresponding to an outermost radial end of a respective lateral surface, the sole, the tread and the sidewalls jointly forming a deformable casing,
    wherein the tread of at least one of the plurality of tires has a generally domed shape, the sidewalls of this tire are generally inclined radially, and the domed shape of the tread and the inclination of the sidewalls are such that the deformation of the casing urges the sole axially outward,
    wherein a straight line passing through a crown of the tread and through one of said junction points crosses a respective lateral surface of the sole, and
    wherein each of the sidewalls has a curvature of constant sign from the tread to the junction point.

2. The agricultural tool according to claim 1, wherein at least one of the sidewalls furthermore has a generally concave and parabolic shape.

3. The agricultural tool according to claim 1, wherein the tire furthermore comprises at least one reinforcement housed in the sole, close to a junction with one sidewall.

4. The agricultural tool according to claim 1, wherein the tire has a working height greater than 28% of the width of the tire.

5. The agricultural tool according to claim 1, wherein at least one of the sidewalls is connected to the sole by way of a shoulder.

6. The agricultural tool according to claim 1, wherein the straight line crosses the lateral surface of the sole in a portion of the sole that corresponds to a radially outer half thickness of the sole.

7. The agricultural tool according to claim 1, wherein the domed shape of the tread and the inclination of the sidewalls are such that the portion of the straight line that extends between the crown of the tread and the junction point between a sidewall and the sole remains within the thickness of said sidewall.

8. A tire comprising:
    a sole by way of which the tire is mounted on a generally cylindrical support, the sole comprising, at opposing ends of the sole in an axial direction of the generally cylindrical support, radially extending lateral surfaces,
    a tread opposite the sole and two sidewalls that connect the tread to the sole via respective junction points, each junction point being situated at a radial position corresponding to an outermost radial end of a respective lateral surface, the sole, the tread and the sidewalls jointly forming a deformable casing, the tread having a generally domed shape, the sidewalls being generally inclined radially, the domed shape of the tread and the inclination of the sidewalls being such that the deformation of the casing urges the sole axially outward, wherein a straight line passing through a crown of the tread and through one of said junction points crosses a lateral surface of the sole, and wherein each of the sidewalls has a curvature of constant sign from the tread to the junction point.

9. A kit comprising:

a generally cylindrical support and at least one tire comprising a sole by way of which the tire is mounted on the support, the sole comprising, at opposing ends of the sole in an axial direction of the generally cylindrical support, radially extending lateral surfaces, a tread opposite the sole and two sidewalls that connect the tread to the sole via respective junction points, each junction point being situated at a radial position corresponding to an outermost radial end of a respective lateral surface, the sole, the tread and the sidewalls jointly forming a deformable casing, the tread having a generally domed shape, the sidewalls being generally inclined radially, the domed shape of the tread and the inclination of the sidewalls being such that the deformation of the casing urges the sole axially outward, wherein a straight line passing through a crown of the tread and through one of said junction points and the sole crosses a lateral surface of the sole, and wherein each of the sidewalls has a curvature of constant sign from the tread to the junction point.

\* \* \* \* \*